US008453194B2

(12) United States Patent
Del Sordo

(10) Patent No.: US 8,453,194 B2
(45) Date of Patent: May 28, 2013

(54) METHOD AND APPARATUS FOR DOWNLOADING SOFTWARE IMAGES TO A MOBILE DEVICE AND TO A HOME NETWORKED DEVICE TO IMPLEMENT COMPATIBLE SERVICES

(75) Inventor: Christopher S. Del Sordo, Souderton, PA (US)

(73) Assignee: Motorola Mobility LLC, Libertyville, IL (US)

( * ) Notice: Subject to any disclaimer, the term of this patent is extended or adjusted under 35 U.S.C. 154(b) by 314 days.

(21) Appl. No.: 12/337,269

(22) Filed: Dec. 17, 2008

(65) Prior Publication Data

US 2010/0154009 A1    Jun. 17, 2010

(51) Int. Cl.
*H04N 7/173* (2011.01)
*H04N 7/16* (2011.01)

(52) U.S. Cl.
USPC ........... 725/141; 725/105; 725/118; 725/132; 725/140

(58) Field of Classification Search
USPC .................................. 725/105, 118, 132, 140
See application file for complete search history.

(56) References Cited

U.S. PATENT DOCUMENTS

| | | | |
|---|---|---|---|
| 2004/0098715 A1 | 5/2004 | Aghera et al. | |
| 2004/0261073 A1 | 12/2004 | Herle et al. | |
| 2005/0090246 A1 | 4/2005 | Leermakers | |
| 2005/0144251 A1 | 6/2005 | Slate | |
| 2005/0223374 A1 | 10/2005 | Wishart et al. | |
| 2006/0129459 A1 | 6/2006 | Mendelsohn | |
| 2007/0042766 A1 | 2/2007 | Herle | |
| 2007/0233782 A1 | 10/2007 | Tali | |
| 2008/0098212 A1* | 4/2008 | Helms et al. | 713/155 |
| 2008/0098450 A1* | 4/2008 | Wu et al. | 725/132 |
| 2008/0134165 A1* | 6/2008 | Anderson et al. | 717/173 |
| 2008/0177998 A1* | 7/2008 | Apsangi et al. | 713/155 |
| 2008/0313691 A1* | 12/2008 | Cholas et al. | 725/131 |

\* cited by examiner

*Primary Examiner* — Kieu Oanh T Bui

(57) ABSTRACT

A method is provided for downloading software to first and second devices. A request is received for a service that is to be implemented on the first and second devices and which is to be interoperable between the first and second devices. An identification of the first and second devices is received. Based in part on the identifications that are received, a first software image is identified for implementing the service on the first device and at least a second software image is identified for implementing the service on the second device such that the first and second images implement the services on their respective devices in a manner that is interoperable with one another. The first software image is provided to a first download server configured to download software images to the first device over a first communications network. The second software image is provided to a second download server configured to download software images to the second device over a second communications network distinct from the first communications network.

15 Claims, 4 Drawing Sheets

SELECT SERVICE

| DIGITAL STILL PICTURE DISPLAY |
| DIGITAL AUDIO |
| VIDEO CONFERENCING |
| GAMES |

*FIG. 2*

SELECT DEVICES

☐ MEDIA CENTER
☑ SET TOP TERMINAL
☑ CELLULAR PHONE
☐ PDA
☐ AUDIO PLAYER

*FIG. 3*

ENTER STT MAKE & MODEL

[            ]

ENTER CELL PHONE MAKE & MODEL

METHOD AND APPARATUS FOR DOWNLOADING SOFTWARE IMAGES TO A MOBILE DEVICE AND TO A HOME NETWORKED DEVICE TO IMPLEMENT COMPATIBLE SERVICES

FIELD OF THE INVENTION

The present invention relates generally to the downloading of software to implement a service on both a mobile device such as a cellular phone and a home networked device such as a set top terminal.

BACKGROUND OF THE INVENTION

The convergence of the personal computer (PC), mobile phones and home media or entertainment centers is likely to give rise to an ever increasing number of services and features that can be offered on these various devices. As the number and sophistication of such services and features continue to grow, many different software packages will be required for their implementation. Increasingly, different software packages offering the same or similar services and features are made available for each different class of device. For example, both mobile phones and home media centers offer the ability to record, render and even capture digital video, still pictures, and audio.

Unfortunately, software designed for a mobile phone generally cannot interact seamlessly with software designed for a home media center, despite offering the same set of services. Typically, the transfer of a service and feature from one class of device to another requires a degree of user intervention to customize and coordinate the different software on the different devices. For instance, a digital audio file downloaded to a mobile phone typically cannot be seamlessly transferred to the home media center for rendering on a stereo system in a manner that is largely transparent to the user.

SUMMARY OF THE INVENTION

In accordance with one aspect of the invention, a method is provided for downloading software to first and second devices. A request is received for a service that is to be implemented on the first and second devices and which is to be interoperable between the first and second devices. An identification of the first and second devices is received. Based in part on the identifications that are received, a first software image is identified for implementing the service on the first device and at least a second software image is identified for implementing the service on the second device such that the first and second images implement the services on their respective devices in a manner that is interoperable with one another. The first software image is provided to a first download server configured to download software images to the first device over a first communications network. The second software image is provided to a second download server configured to download software images to the second device over a second communications network distinct from the first communications network.

In accordance with another aspect of the invention, a cable headend is provided that includes an input for receiving content to be broadcast to subscriber devices over a broadband access network and a subscriber management system for coordinating delivery of content to the subscriber devices. The cable headend also includes a download server for downloading software images to the subscriber devices over the broadband access network. A software application system is provided for distributing first and second software images to a first of the subscriber devices and a mobile wireless device, respectively. The software application system is configured to (i) distribute the first software image to the first subscriber device via the download server and (ii) distribute the second software image to the mobile device via a communications network distinct from the broadband access network. The first and second software images are configured to implement a service on the first subscriber device and the mobile device, respectively, in a manner that is interoperable with one another.

BRIEF DESCRIPTION OF THE DRAWINGS

FIG. 2 shows an example of a menu of service options that may be presented to the user.

FIGS. 3 and 4 show a menu and sub-menu, respectively, from which the user can select the devices on which the service is to be implemented.

DETAILED DESCRIPTION

As used herein, the term "software image" refers to a set of processor readable data and a set of processor executable instructions that are logically combined into a single logical entity. The logical entity may include a set of physical components like databases, data files, records, tables, executable programs, source code, objects, dynamic link libraries, and the like. The logical entity may also include, for example, rules for combining, processing, initiating and so on the physical components. One example of a software image is an application. As used herein, the term "application" refers generally to a unit of executable software that implements a theme-based service or function. The themes of applications vary broadly across any number of disciplines and functions (such as e-commerce transactions, brokerage transactions, home entertainment, games etc.), and one application may have more than one theme and offer more than one service. Other examples of software images include upgrades, patches, drivers and the like, which enhance one or more applications so that an additional or enhanced service or function is made available.

Figure 1:
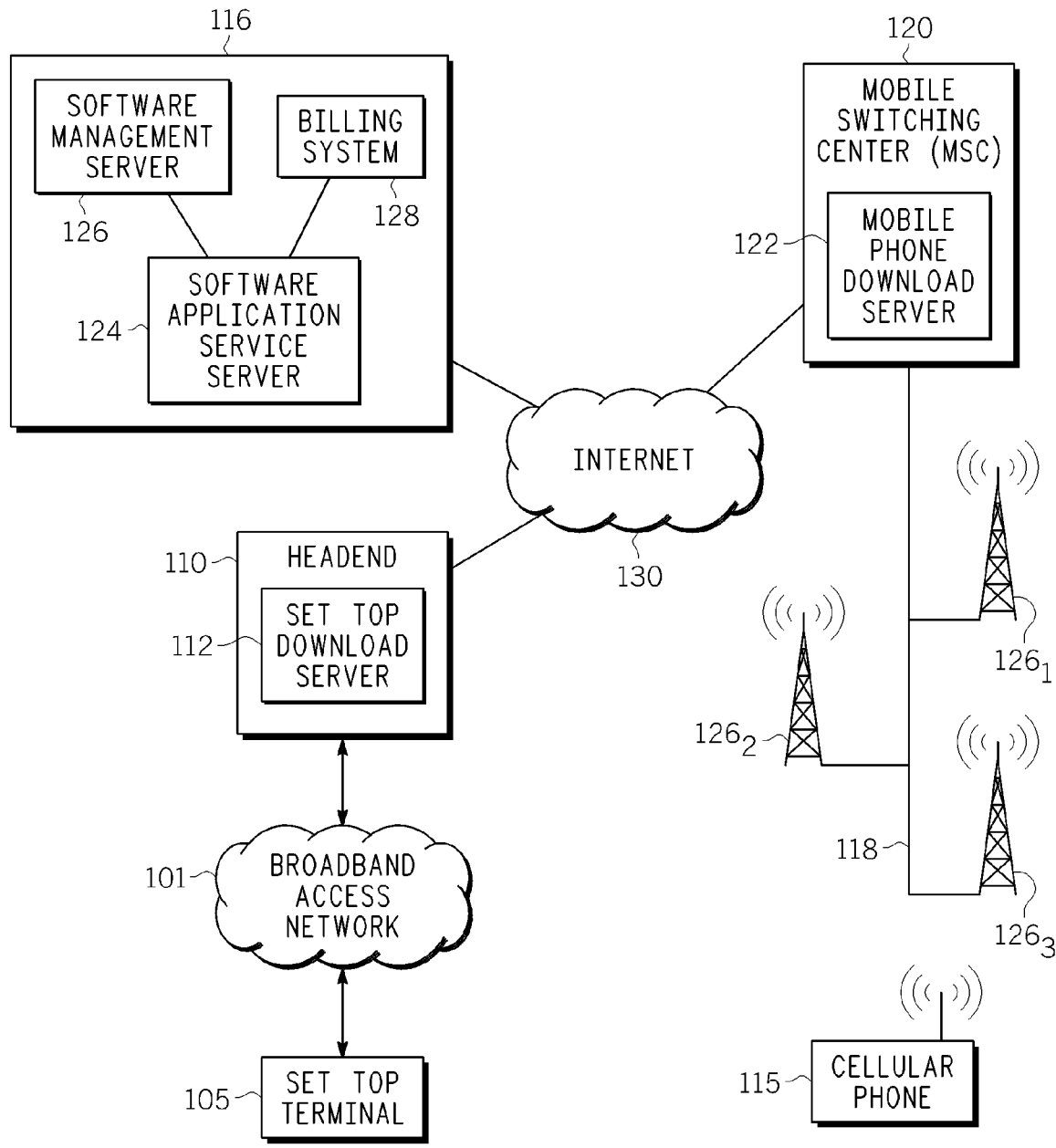
FIG. 1 shows one example of a system architecture that can be used to download software images to both consumer premises equipment (CPE) and a mobile device such as a cellular phone.

FIG. 1 shows one example of a system architecture that can be used to download software images to both consumer premises equipment (CPE) and a mobile device such as a cellular phone. The software images that are downloaded are designed to implement one or more services that work seamlessly with one another on both the CPE and the mobile device. That is, the same service can be offered on both devices so that they are interoperable with one another with little or not device reconfiguration required on the part of the user. Consumer Premises Equipment may be any device such as PCs, media centers, set-top boxes, PDAs, portable computers and portable media players that can communicate over a network. The mobile devices may be any suitable wireless devices, including conventional cellular radiotelephones, PCS handset devices, personal digital assistants and portable computers. Significantly, the CPE and the mobile device communicate over different communication networks. For instance, if the CPE is a set top terminal, it communicates over a cable or satellite network, whereas if the mobile device is a cellular phone, it communicates over a cellular network.

For purposes of illustration the following discussion will assume that the CPE is a set top terminal and that the mobile device is a cellular phone. It should be noted however that in all cases the concepts and techniques are more generally applicable to a variety of other client devices and mobile devices and not just set top terminals and cellular phones.

The various components of the system architecture 100 includes a software application system 116, a content distribution system that includes headend 110 and broadband access network 101, and a cellular communication system that includes mobile switching center 120 and base stations 126. The content distribution system delivers programming content to client devices such as set top terminals, represented in FIG. 1 by set top terminal 105. The cellular communication system provides cellular communications services to mobile devices such as cellular phones, represented in FIG. 1 by cellular phone 115.

Set top terminal 105 is in communication with the headend 110 over the broadband access network 101. Broadband access network 101 is a point-to-point network that distributes signals to all or a subset of the subscribers in the system. Broadband access network 101 may comprise an edge QAM modulator and a hybrid fiber-coax (HFC) network, for example. The edge modulator receives Ethernet frames that encapsulate transport packets, de-capsulate these frames and remove network jitter, implements modulation and, performs frequency up-conversion and transmits radio frequency signals representative of the transport stream packets to end users over the HFC network. In the HFC network, the transport stream is distributed from the headend (central office) to a number of second level facilities (distribution hubs). Each hub in turn distributes carriers to a number of fiber nodes. In a typical arrangement, the distribution medium from the headend down to the fiber node level is optical fibers. Subscriber homes are connected to fiber hubs via coaxial cables. Instead of using an edge modulator and an HFC network, broadband access network 101 may alternatively comprise, for example, a packet-switched network that is capable of delivering IP packets directly to the set top terminal 105 using, for example, a cable data network, PON, or the like.

While content such as audio and video is distributed by the headend to the set top terminal over in-band channels, control messages and the like may be communicated between the headend and the set top terminal 105 over out-of-band (OOB) or DOCSIS channels or an IP tunnel or an IP connection and associated protocols. To distribute software images to the set top terminal 105, the software images may be configured as objects that may be sent in the in-band and/or the OOB channels. For example, certain objects may reside on a set top download server 112 associated with the headend 110 and may be transferred to the set top terminal 105 using a data carousel. As is well known in the art, a carousel may be viewed as a repository of objects which repeatedly transmits the various components of a particular object. The object components of the carousel utilized herein are sent in a continuous round-robin fashion. If the client device misses a desired or necessary object in one carousel transmission, it can wait for the next. The full complement of objects may be sent on a number of object carousels that are appropriately identified through an object signaling mechanism appropriate for the given system.

The data carousel may use any of a variety of techniques and protocols to download the objects to the client devices. For example, an object may be configured as part of the program content on a given in-band (e.g., FAT channel) or DOCSIS channel or Out of Band channel and transmitted in a broadcast or on-demand fashion. In one particular example in which MPEG is used as the transport layer protocol, an object is carried in its own elementary stream with an assigned PID. In yet another implementation, the object is downloaded directly in the form of IP (Internet Protocol) packets in an IP channel using an appropriate protocol such as TFTP or the like.

It should be noted that download server 112 may download software images to the set top terminal 105 in any appropriate manner and is not limited to their distribution as objects by the carousel transmission technique described above.

Turning now to the cellular phone 115, cellular phone 115 communicates over a wireless network that includes a series of cell sites that each contain a base station, such as base stations $126_1$, $126_2$ and $126_3$. The base stations 126 each include a base station controller and one or more base transceiver subsystem(s). A base station controller is a device that manages wireless communications resources, including the base transceiver stations, for specified cells within a wireless communications network. A base transceiver subsystem comprises the RF transceivers, antennas, and other electrical equipment located in each cell site.

The cellular phone 115 wirelessly communicates with the base station 126 in the cell in which the phone currently resides. The base stations 126, in turn, communicate with a mobile switching center 120 via communication link 118. The mobile switching center 120 is a switching device that provides services and coordination between the subscribers in a wireless network and external networks, such as the public switched telephone network (PSTN) (not shown) or a packet-switched network such as the Internet 130. Communication link 118 may be any suitable connection means, including a T1 line(s), a T3 line(s), a fiber optic link(s), a network packet data backbone connection, or any other type of data connection. Line 118 links each vocoder in the base stations with switch elements in mobile switching center 120. Those skilled in the art will recognize that the connections on line 118 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on line 118 may also provide a transmission path for transmission of analog or digital control signals in a suitable signaling protocol.

In some examples the wireless network may be a 2G radio system such as a GSM (Global System for Mobile Communications), which is based on the TDMA (Time Division Multiple Access) technology. In other examples, the wireless network is a 3G radio system which is based on a GSM system which utilizes WCDMA (Wideband Code Division Multiple Access) technology or a UMTS (Universal Mobile Telecommunications System). In the case of a UMTS network, for instance, mobile switching center 120 may be incorporated in a core network that also includes such devices as a serving GPRS support node (SGSN), which is the center point of the packet-switched side of the core network 100 and a gateway GPRS support node (GGSN), which is the packet-switched side counterpart to the gateway mobile services switching center. The base station 126 in a UMTS network, for instance, may be incorporated in a radio access network that includes radio network controllers and nodes B.

Mobile switching center 120 includes a mobile phone download server 122. Similar to set top download server 112, download server 122 downloads software images to the mobile device 115 by way of any suitable protocol such as those available from the Open Wireless Alliance (OWA), including, for instance, the Wireless Application Protocol (WAP), as well as other standard or proprietary protocols.

The system architecture shown in FIG. 1 also includes a software application system 116. The software application system 116 may comprise a plurality of devices which provide services related to the distribution of software images to the set top terminal 105 and the cellular phone 115. These services may comprise receiving online software orders from the set top terminal 105 and/or the cellular phone 115. Services may also comprise requesting user identification from users of a set top terminal 105. Furthermore, services may comprise the downloading of software images to the set top download server 112 and the mobile phone download server 122. Additional services may comprise tracking of downloads of software images associated with an online software order, and the termination of downloads upon fulfilling delivery of all software images comprising an online software order.

In the particular implementation of the system architecture shown in FIG. 1, the software application system 116 downloads the software images to the set top download server 112 and the mobile phone download server 122 over a packet-switched network such as the Internet 130. More generally, however, the software application system 116 may deliver the software images to the set top download server 112 and the mobile phone download server in any appropriate manner based on the particular system architecture that is employed. For instance, in some implementations the software application system 116 may be associated with, and possibly even located in, either the headend 110 or the mobile switching center 120. In the implementation shown in FIG. 1, the party authorized to administer and operate software application system 116 may be different from the party authorized to administer and operate headend 110 or the mobile switching center 120. On the other hand, if the software application system 116 is associated with the headend 110, a single party (e.g., an MSO) may be authorized to administer and operate both the headend (and the broadband access network or cable distribution system of which it is a part) and the software application system 116. Similarly, if the software application system 116 is associated with the mobile switching center 120, a single party (e.g., a cellular service provider) may be authorized to administer and operate both the mobile switching center 120 (and the cellular network of which it is a part) and the software application system 116.

In the implementation shown in FIG. 1, software application system 116 includes a front end software application service server 124, a software management server 126 and a billing system 128. The front end server 124 receives the software orders from the set top terminal 105 or the cellular phone 115 and requests user identification from users of a set top terminal 105. The front end server 124 also downloads the requested software to the set top download server 112 and the mobile phone download server 122, which in turn respectively download the software to the set top terminal and the cellular phone 115. The front end server 124 also sends the request to billing system 128, which maintains account information and ensures that the appropriate party is billed for the software order.

The software order received by the front end server 124 indicates that the order is for the delivery of software items, in this example, to both a set top terminal and a cellular phone.

The front end server 124 also receives model numbers or other identifiers that identifies the set top terminal and the cellular phone. The identifiers may be provided to the front end server 124 either in the initial order or in response to a request for additional information. The identifiers are used to locate the appropriate versions of the requested software images that are compatible for operation on the set top terminal and the cellular phone.

The set top terminal and mobile phone identifiers received by the front end server 124 are provided to the software management server 126. The software management server 126 maintains a database of available software images, the different versions of each software item that are available and a list of set top terminals and cellular phones that are compatible with each version. The database also includes pointers to the location of each version of the software item. The software images will generally reside on the software management server 126 but alternatively may be located on one or more separate servers. The software management server 126 uses the set top terminal and cellular phone identifiers to select the appropriate software versions to be downloaded to each device. The software management server 126 may perform a compatibility check to ensure that the selected versions are interoperable with one another.

The user may initiate the acquisition of the software items necessary to implement a desired service using either the set top terminal 105 or cellular phone 115. Assuming the user initiates the acquisition of the software items through the set top terminal, the user, via the set top terminal's user interface (e.g., a remote control unit), may first access a menu from which various services may be selected. The menu may be presented on a display device (e.g., a television) associated with the set top terminal. One example of such a menu is shown in FIG. 2. In this example the menu options include services to implement a digital still picture display, a digital audio player, video conferencing and games. Some of these options may have submenus associated with them, where appropriate. For instance, if the user chooses the games option, submenus may be presented from which the user can select individual games.

After selecting the desired service, a second menu is presented (see FIG. 3) which allows the user to select one or more devices on which the selected service is to be implemented, in addition to the device the user is currently using (i.e., the set top terminal in this example). In this example the user has the option of selecting as the additional device a media center, a second set top terminal, a cellular phone, a PDA and an audio player. Next, as shown in FIG. 4, the user is asked to enter the make and model number of the selected device or devices. Alternatively, the user may be presented with a pull-down menu that provides a list of makes and models from which the user may choose. This example assumes that the front end server 124 can automatically detect the make and model of the set top terminal currently being used by the user. If this is not the case, the menus may request the user to provide this information as well.

Once the software application system 116 has received the information concerning the service that is desired and the devices on which the service is to be implemented, the appropriate software images are located and downloaded to the respective devices in the manner described above. After the software images have been downloaded the user may initiate a compatibility check during which the two devices will exchange information and determine which features of the service are interoperable with one another. For instance, if the service being implemented is an audio player, the set of available features may include the ability to record and play MP3 file, AAC files, FLAC files, and Windows Media Audio files and the ability to download album cover artwork. While all these features may be operable on say, the set top terminal, only a subset of them may be operable on the cell phone. The two devices will determine which features are available to each of them, thus determining precisely which features of the service are interoperable with one another. The results of this determination may be presented to the user on the devices' respective displays.

The user may be prompted to initiate the compatibility check through a menu that is provided by the downloaded software. The user may receive confirmation of the successful (or unsuccessful) completion of the compatibility check. The confirmation may include a list of those features on both devices that are interoperable with one another. After receiving the confirmation the user may be prompted to confirm to the software application system 116 that the download of the software images was successful, thereby completing the download process.

The exchange of information between the two devices for performing the compatibility check and for the subsequent seamless implementation of the service can be accomplished using a short range wireless connection of the type that is often used to eliminate cables/wires/cords between devices (e.g., between cellular telephones and headsets) and provides services when devices are in close proximity to one another. One example of a short range wireless standard is Bluetooth. The area over which Bluetooth and other short-range wireless connections operate is often referred to as a personal area network or piconet. Bluetooth is a standard and a specification for small form-factor, low-cost, short range radio links between mobile PCs, cellular phones and other portable devices. Bluetooth operates in the unlicensed Industrial, Scientific & Medical (ISM) band at a nominal 2.4 GHz and achieves a range of about 10 meters using a 1 milliwatt transmitter. Data transfer speeds of about 720 Kbps are typical for Bluetooth wireless connections. Bluetooth represents only one example of a suitable communication technique that may be employed. Other short-range RF techniques that may be used to communicate over a personal area network include code division multiple access (CDMA), time division multiple access (TDMA), frequency-division multiplexing (FDM), spread-spectrum, global system for mobile communications (GSM), high-speed circuit-switched data (HCSD), general packet radio system (GPRS), enhanced data GSM environment (EDGE), and universal mobile telecommunications service (UMTS). Of course, these are only examples, and other wireless technologies may be employed as well. Moreover, in some implementations the two devices may even communicate with one another over a wired communication link.

Figure 5:
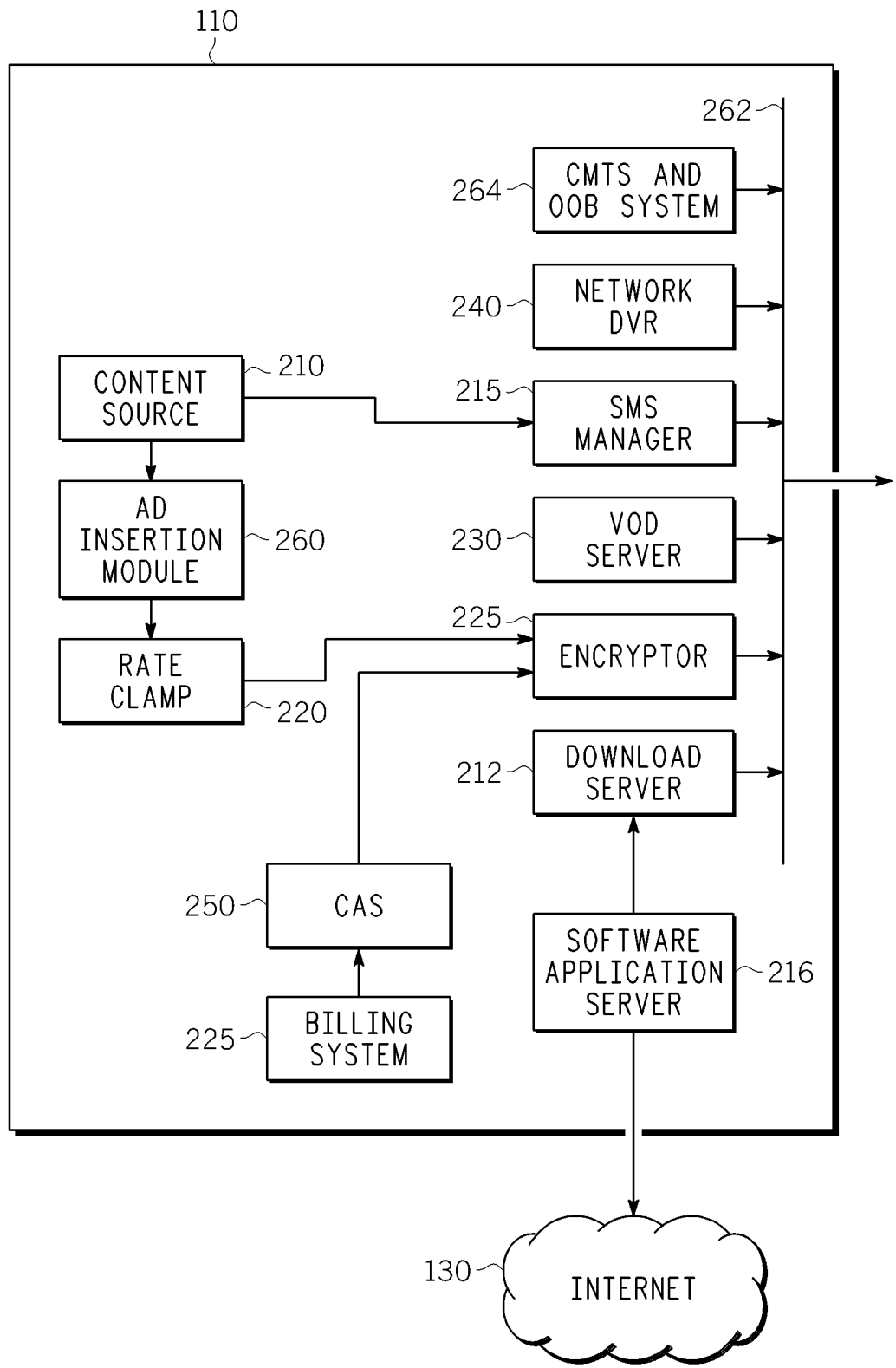
FIG. 5 shows one example of a headend.

As previously mentioned, in some implementations the software application system 116 may located in the headend 110. FIG. 5 shows one example of such a headend 110. The headend 110 includes a broadcast content source 210, which may include, by way of example, satellite receivers, off-air receivers and/or content storage devices such as servers. Programs are delivered from the content source 210 to one or more encryptors 225 using, for example, IP multicast addressing. The content is then encrypted by the encryptor 225 and transmitted to the broadband access network 101. Typically, standard definition (SD) channels are currently rate clamped by rate clamp 220 to 3.75 Mbps while high definition channels are currently rate clamped by rate clamp 220 to between about 12 Mbps and 15 Mbps. The encryptors 225 encrypt the digitally encoded content, often under the control of a conditional access system (CAS) 250, which operates in conjunction with a billing system 255. The CAS 250 provides encryption control provisioning parameters such as cryptographic keys to support content encryption. The headend 110 also includes other typical headend components and services such as an advertising insertion module 260 for inserting ads to content prior to deliver to the encryptors 225, a subscriber management system (SMS) 215 system for coordinating delivery of content to subscribers, a cable-modem termination system (CMTS) and out-of-band (OOB) system 264 and a LAN(s) 262 for placing the various components in data communication with one another.

Headend 110 may also include a variety of other components for offering additional services such as a video on demand (VOD) server 230 and a network DVR 240, for example, which operate under the control of the SMS 215. The VOD server 230 stores programs or other content for distribution to subscribers on an on-demand basis. The network DVR 240 stores content that can be transmitted to set top terminal via a hub and access network in response to a user request to play a program stored on the DVR 240. Other user input requests are also serviced by network DVR 240, including, for example, requests to accelerate the playing of a program in the forward direction (e.g., cueing) and in the reverse direction (e.g., reviewing). The content is stored by the network DVR 240 upon a user request. The content may be provided to the network DVR 240 from any available content source, including, for example, content source 210.

Also shown in FIG. 5 are a download server 212 and a software application server 216. The download server 212 and the software application server 216 correspond to download server 112 and software application system 116 depicted in FIG. 1, which have been previously described. It will also be appreciated that the headend configuration depicted in FIG. 2 is a high-level, conceptual architecture and that other headend architectures may also be employed.

Figure 6:
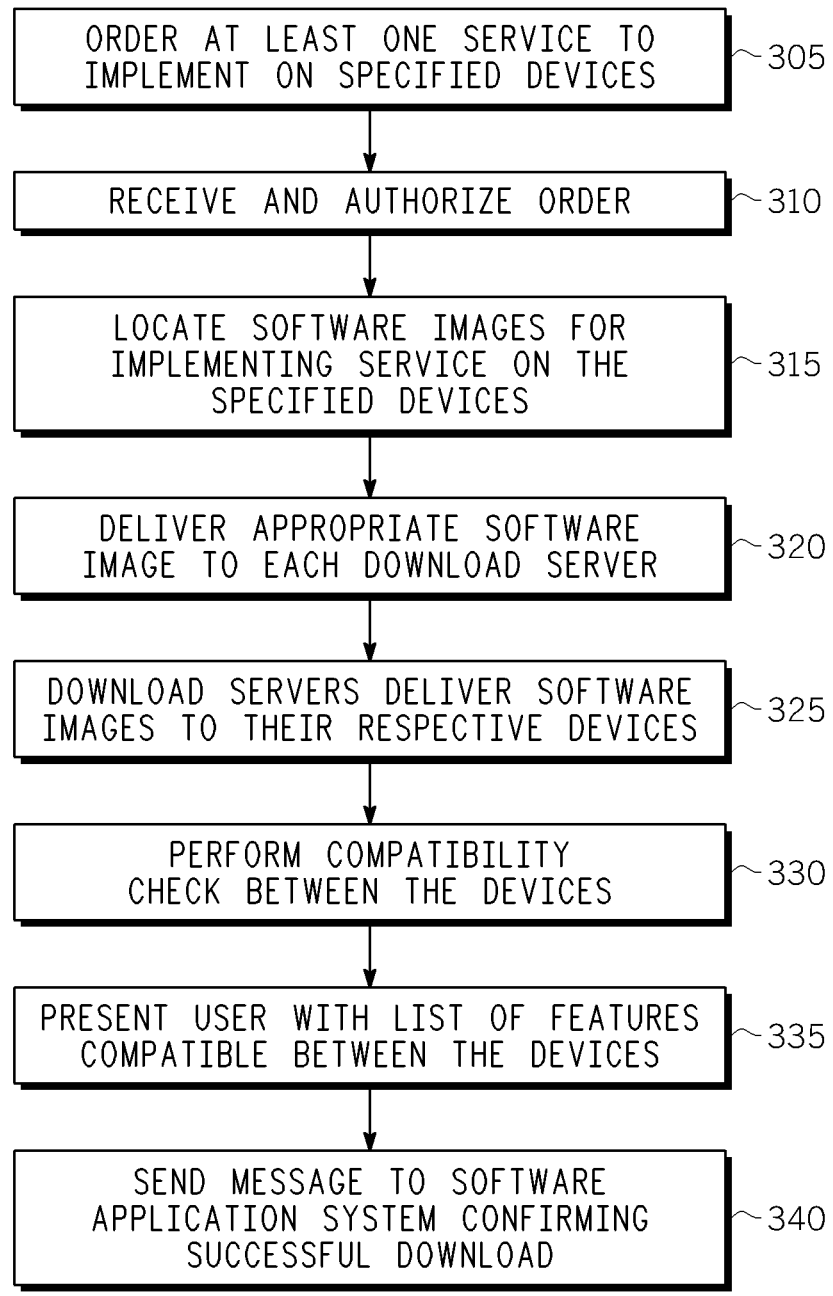
FIG. 6 is a flowchart showing one example of a process by which a user downloads software to a set top terminal and cellular phone.

FIG. 6 is a flowchart showing one example of a process by which a user downloads software to a set top terminal and cellular phone. The software that is downloaded implements a common service or services on each device. The software allows the user to seamlessly transfer information between the two devices so that the information can be used in connection with the same service on each device. The user begins the process in step 305 by ordering one more services through either the set top terminal or the cellular phone. For instance, the user may request a service that allows video clips to be displayed and MP3 audio files to be rendered. The order includes pertinent identifying information concerning the devices onto which the software is to be downloaded along with any necessary user account information. The order is delivered to the software application system over the appropriate communication network or networks. In step 310 the software application system receives the request, authorizes the order through the billing system and sends a confirmation of the order to the user. In step 315 the software application system locates the two software images that implement the requested service, one of which is compatible with the user's set top terminal and the other of which is compatible with the user's cellular phone. The software images are also compatible with one another to allow interoperability. In step 320 the software application server delivers the appropriate software image to each devices' download server. The download servers, in turn, deliver the software images to their respective devices in step 325. In the case of the set top terminal, the software image is delivered over a content delivery system that includes a broadband access network. In the case of the cellular phone, the software image is delivered over a cellular network. Once downloaded and installed, in step 330 the user performs a compatibility check in which the software on the two devices communicate with one another over a short-range wireless link to ensure that at least some of the features provided by the service are compatible and interoperable with one another. A list of the compatible features is provided to the user in step 335. Finally, in step 340, the user sends a message to the software application system confirming that the download was successful.

The invention claimed is:

1. A method for downloading software to a first device and a second device, the method comprising:
   receiving a request for downloading software for performing a service, the request comprising an identification of a service that can be performed by a first software image on the first device and by a second software image on the second device;
   receiving an identification of the first device and an identification of the second device;
   based in part on the identifications that are received, identifying a first software image for implementing the service on the first device and at least a second software image for implementing the service on the second device, such that the first and second software images comprise stored instructions that, when executed by one or more processors of their respective devices, respectively enable the first and second devices to provide one or more interoperable features that are available features of the service on both the first device and the second device; and
   providing the first software image to a first download server configured to download software images to the first device over a first communications network and providing the second software image to a second download server configured to download software images to the second device over a second communications network distinct from the first communications network;
   wherein the first device is a set top terminal and the first communications network is a broadband access network;
   wherein the second device is a mobile wireless device and the second communications network is a cellular network; and
   wherein the first device and the second device are able to exchange information identifying to each other available features of the service on the respective devices, and do not communicate directly with each other over either the first communications network or the second communications network.

2. The method of claim 1 wherein the request is received from the set top terminal.

3. The method of claim 1 wherein the first download server is associated with a cable headend and the second download server is associated with a mobile switching center.

4. The method of claim 1 wherein the service is selected from the group consisting of a digital still picture display, a digital audio player, video conferencing and games.

5. The method of claim 1 wherein the request is received from the first device by a cable headend and the first download server is associated with the headend.

6. The method of claim 5 wherein the second software image is provided from the cable headend to the second download server over the Internet.

7. The method of claim 6 further comprising downloading the first software image to the first device over a broadband access network.

8. The method of claim 1 wherein at least one of the first or second software images is provided to the first or second download server, respectively, over the Internet.

9. At least one computer-readable medium encoded with instructions which, when executed by a processor, performs the method set forth in claim 1.

10. A cable headend, comprising:
    an input for receiving content to be broadcast to subscriber devices over a broadband access network;
    a subscriber management system for coordinating delivery of content to the subscriber devices;
    a download server for downloading software images to the subscriber devices over the broadband access network;
    a software application system for distributing first and second software images to a first of the subscriber devices and a mobile wireless device, respectively, wherein the software application system is configured to (i) distribute the first software image comprising a first set of processor-executable instructions, to the first subscriber device via the download server and (ii) distribute the second software image comprising a second set of processor-executable instructions to the mobile wireless device via a communications network distinct from the broadband access network, and further wherein the first and second software images are configured to implement a service that can be performed by the first software image on the first subscriber device and by the second software image on the mobile wireless device, respectively, in a manner that enables the first subscriber device and the mobile wireless device to provide one or more interoperable features that are available features of the service on both the first subscriber device and the mobile wireless device;
    wherein the first subscriber device is a set top terminal;
    wherein the communications network is a cellular network; and
    wherein the first subscriber device and the mobile wireless device are able to exchange information identifying to each other available features of the service on the respective devices, and do not communicate directly with each other over either the broadband access network or the communications network.

11. The cable headend of claim 10 wherein the software application system is configured to deliver the second software image to a second download server associated with the mobile wireless device.

12. The cable headend of claim 11 wherein the software application system is configured to deliver the second software image to the second download server over the Internet.

13. The cable headend of claim 10 wherein the software application system is further configured to receive over the broadband access network a user request for delivery of software needed to implement the service on the first subscriber device and the mobile wireless device.

14. A method for initiating downloading compatible feature specific software to an initial device and a secondary device in a manner that enables the devices to provide one or more interoperable features that are available features of the service on both the initial device and the secondary device, the method comprising, in the initial device:
    receiving, from a user, feature identification information and secondary device model identification information;
    communicating the secondary device model identification information to a headend device to initiate downloading of a first feature-compatible software upgrade to the initial device and a second feature-compatible software upgrade to the secondary device;

receiving the first feature-compatible software upgrade;

exchanging with the secondary device information for performing a feature compatibility check with the secondary device;

determining that the secondary device has also received the feature-compatible upgrade; and based on the determining, providing to the user an indication that at least one feature of the feature-compatible upgrade is available on the secondary device.

15. A method for initiating downloading compatible first and second feature-specific software to an initial device and a secondary device in a manner that enables the devices to provide one or more interoperable features that are available features of the service on both the initial device and the secondary device, the method comprising, in the secondary device:

receiving from the initial device information for performing a feature compatibility check;

sending to the initial device a response message comprising an indication of one or more available features of the service on the secondary device;

receiving a software upgrade comprising the second feature-specific software;

responsively to receiving the software upgrade, sending to the initial device an updated indication of an updated one or more available features of the service on the secondary device.

* * * * *